United States Patent
Acharya et al.

(10) Patent No.: US 10,606,974 B1
(45) Date of Patent: Mar. 31, 2020

(54) SYSTEM AND METHOD FOR DYNAMIC VISUAL GUIDANCE OF MUTUALLY PAIRED COMPONENTS IN A CIRCUIT DESIGN EDITOR

(71) Applicant: CADENCE DESIGN SYSTEMS, INC., San Jose, CA (US)

(72) Inventors: Amiya Acharya, New Delhi (IN); Vikas Kohli, Noida (IN)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 96 days.

(21) Appl. No.: 15/911,421

(22) Filed: Mar. 5, 2018

(51) Int. Cl.
  *G06F 17/50* (2006.01)
  *G06F 13/42* (2006.01)
  *H03F 3/213* (2006.01)
  *H03F 3/195* (2006.01)

(52) U.S. Cl.
  CPC .......... *G06F 17/5072* (2013.01); *G06F 13/42* (2013.01); *G06F 13/4291* (2013.01); *G06F 17/5068* (2013.01); *G06F 17/5077* (2013.01); *H03F 3/195* (2013.01); *H03F 3/213* (2013.01)

(58) Field of Classification Search
  CPC .. G06F 13/42; G06F 13/4291; G06F 17/5077; G06F 17/5072; H01L 23/5386; H03F 3/195; H03F 3/213
  See application file for complete search history.

(56) References Cited

U.S. PATENT DOCUMENTS

| | | | | |
|---|---|---|---|---|
| 7,117,459 B2* | 10/2006 | Tanimoto | ............ | G06F 17/5036 716/112 |
| 7,353,483 B2* | 4/2008 | Hamada | ............... | G06F 17/5036 716/112 |
| 7,412,683 B2* | 8/2008 | Mimura | .............. | G06F 17/5072 716/137 |
| 8,271,925 B2* | 9/2012 | Kobayashi | .......... | G06F 17/5077 716/106 |
| 8,275,597 B1* | 9/2012 | Oh | ....................... | G06F 17/5036 703/14 |
| 8,316,342 B1* | 11/2012 | Kukal | .................. | G06F 17/5045 703/13 |
| 9,071,193 B1* | 6/2015 | Caviglia | .............. | H03B 5/1228 |
| 9,122,384 B1* | 9/2015 | Kohli | ....................... | G09G 5/02 |
| 9,619,605 B1* | 4/2017 | Kohli | .................. | G06F 17/5072 |

* cited by examiner

*Primary Examiner* — Helen Rossoshek
(74) *Attorney, Agent, or Firm* — Tarolli, Sundheim, Covell & Tummino LLP

(57) ABSTRACT

In an electronic circuit design system, dynamic visual guidance for relative placement of mutually paired electronic components, such as a bypass capacitance portion and a power pin in a power domain, is provided. A first, selected component is adaptively paired with one of a plurality of second components eligible for pairing with the first component, according to predetermined pairing criteria such as proximity criteria. A mutual placement zone between the paired components is generated to define a locus of valid placement locations of the paired first and second components one with respect to the other according to predetermined placement criteria therefor. Visual indicia to represent the mutual placement zone is generated, thereby providing visual guidance to reposition the first component.

12 Claims, 10 Drawing Sheets

SYSTEM AND METHOD FOR DYNAMIC VISUAL GUIDANCE OF MUTUALLY PAIRED COMPONENTS IN A CIRCUIT DESIGN EDITOR

BACKGROUND OF THE INVENTION

The subject system and method are generally directed to displaying and editing a circuit design on a circuit design editor. The system and method generally provide for dynamic visual guidance which directs valid placement, according to predetermined placement criteria, of a component relative to any of a plurality of other components, without excessive visual "clutter" in the editor resulting from the visual guidance.

With conventional electronic circuit designs generally rising both in complexity and precision, the need for increasingly robust circuit design editor systems continues to increase. Circuit design editors allow a circuit designer or design team to arrange, configure, and adjust various electronic components and the interconnections therebetween of an electronic circuit design in a virtual design environment, for ultimate physical manufacture of the resulting circuit design. Various editors also support computer simulation-based assessment of a circuit's behavior, and testing of the circuit design for flaws in power, timing, or other operational features or properties, which assist the circuit designer in making any necessary adjustments.

Additional features provided for various editors include automated measures for monitoring the design to confirm suitable compliance with predetermined design and/or operational criteria. The circuit product implementing the circuit design may thereby be improved and brought into compliance with the applicable criteria before time and expense are actually incurred in manufacturing a physical circuit in accordance with the design's physical layout.

Because of the complexity of the circuits being designed, a graphic representation of a circuit design layout may appear excessively crowded with information as displayed by a circuit design editor, yet lack the effective display of the information most on point to the design task or problem at hand. Even for the most capable and experienced user, the visually presented graphic display may for such reasons be of far less use than it could be. It is therefore an ongoing effort in the field to distinguish pertinent information from non-pertinent and intuitively present the former while minimalizing presentation of the latter, in a manner that makes efficient and productive use of the circuit editor's visual display capabilities.

SUMMARY OF THE INVENTION

It is an object of the disclosed system and method to enable flexible placement and pairing of a selected component relative to any of a plurality of second components.

It is another object of the disclosed system and method to adaptively present visual indicia for one or more relevant zones of placement while preventing cluttering of a presented layout with excessive indicia.

These and other objects may be attained in a system and method for dynamic visual guidance of mutually paired components in a circuit design editor. In accordance with certain embodiments of the present invention, a system is provided for interactively editing an electronic circuit design defined by a plurality of electronic components mutually placed relative to one another and interconnected by a plurality of nets routed therebetween, having dynamic visual guidance for relative placement of mutually paired electronic components. The system includes a display visually rendering at least a part of an electronic circuit design to graphically represent a physical layout thereof. The system also includes a user interface for entry of user-controlled movement of a first component of the electronic circuit design within the visually rendered physical layout. The system also includes a graphic layout controller executed on a processor coupled to the display. The graphic layout controller includes a component pairing portion adaptively pairing with the first component at each selected location thereof within the visually rendered physical layout at least one of a plurality of second components of the electronic circuit design eligible for pairing with the first component, the first and second components being paired according to predetermined proximity criteria. The graphic layout controller also includes a placement guiding portion actuated responsive to the component pairing portion to generate for each paired set of first and second components visual indicia representing a mutual placement zone between the first component and each second component paired therewith. The mutual placement zone defines a locus of valid placement locations of the paired first and second components one with respect to the other according to predetermined placement criteria therefor.

In accordance with other embodiments of the present invention, a system is provided for interactively editing an electronic circuit design defined by a plurality of electronic components mutually placed relative to one another and interconnected by a plurality of nets routed therebetween, having dynamic visual guidance for relative placement of mutually paired electronic components. The system includes a display visually rendering at least a part of an electronic circuit design to graphically represent a physical layout thereof. The system also includes a user interface for entry of user-controlled movement of a first component of the electronic circuit design within the visually rendered physical layout. The system also includes a graphic layout controller executed on a processor coupled to the display. The graphic layout controller includes a component pairing portion adaptively pairing with the first component at each selected location thereof within the visually rendered physical layout at least a closest one of a plurality of second components of the electronic circuit design eligible for pairing with the first component. The graphic layout controller also includes a placement guiding portion actuated responsive to the component pairing portion to generate for each paired set of first and second components visual indicia representing a mutual placement zone between the first component and each second component paired therewith. The mutual placement zone defines a locus of valid placement locations of the paired first and second components one with respect to the other according to predetermined placement criteria therefor.

In accordance with still other embodiments of the present invention, a method is provided for interactively editing an electronic circuit design defined by a plurality of electronic components mutually placed relative to one another and interconnected by a plurality of nets routed therebetween, having dynamic visual guidance for relative placement of mutually paired electronic components. The method includes visually rendering on a display at least a part of an electronic circuit design to graphically represent a physical layout thereof. The method also includes providing a user interface for entry of user-controlled movement of a first component of the electronic circuit design within the visually rendered physical layout. The method also includes adaptively pairing with the first component at each selected location thereof within the visually rendered physical layout at least one of a plurality of second components of the electronic circuit design eligible for pairing with the first component, the first and second components being paired according to predetermined proximity criteria. The method also includes generating for each paired set of first and second components visual indicia representing a mutual placement zone between the first component and each second component paired therewith, the mutual placement zone defining a locus of valid placement locations of the paired first and second components one with respect to the other according to predetermined placement criteria therefor.

Additional aspects, details, and advantages of the disclosed system and method will be set forth, in part, in the description and figures which follow.

DETAILED DESCRIPTION OF THE PREFERRED EMBODIMENTS

Figure 1A:
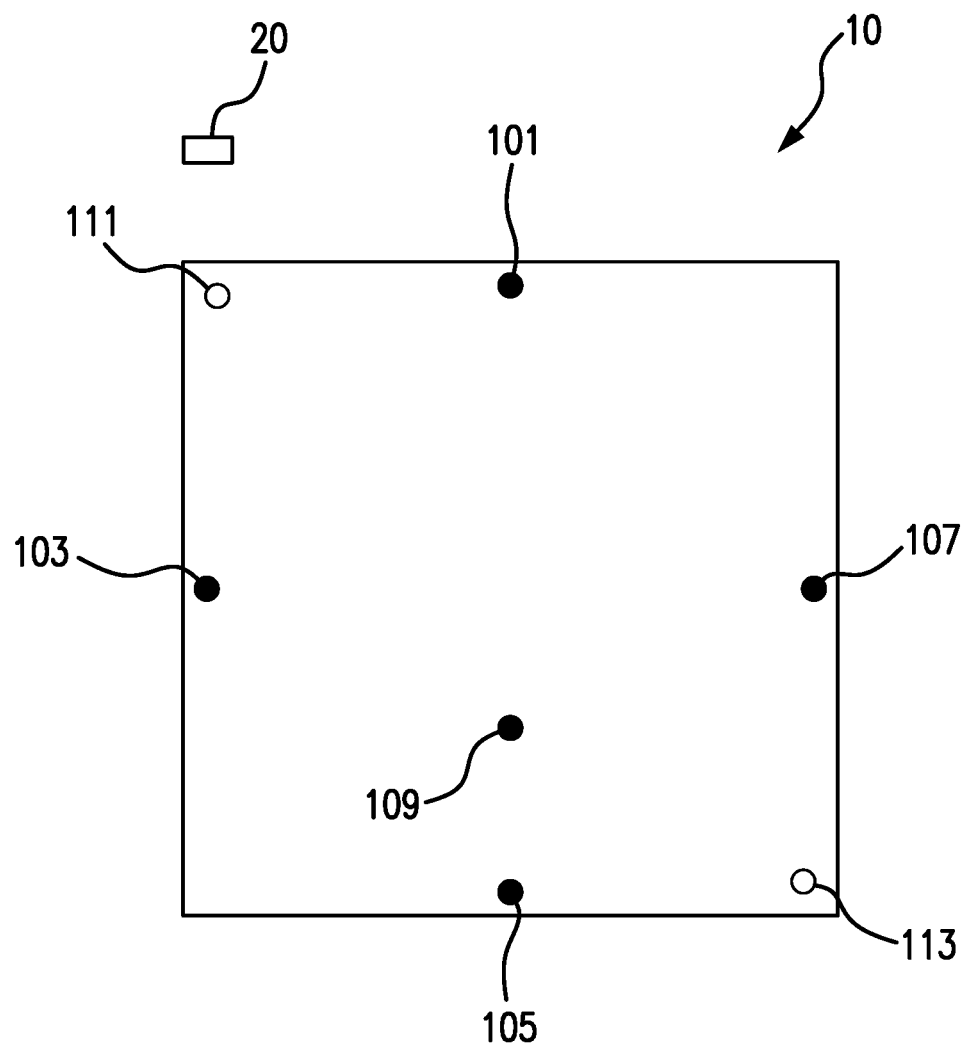
FIGS. 1A-1E are depictions of an illustrative example of a circuit layout, as presented in a circuit layout editor in accordance with various exemplary embodiments of the present invention.

Reference will now be made in detail to exemplary embodiments, which are illustrated in the accompanying drawings, wherein like reference numerals refer to the like elements throughout. The embodiments are described below in order to explain the disclosed system and method with reference to the figures shown in the drawings.

During the course of arranging different portions of an electronic circuit design layout, such as its components, pins, and routed interconnections routed therebetween, the designer cannot ignore mutual proximity requirements between certain portions to ensure proper circuit operation in practice. One of numerous examples is found in the selective arrangement of requisite components like bypass capacitors in relation to certain interconnection nets serving as voltage or other power source rails. To ensure clean power, for instance, the negative effects of stray AC noise components on a given net are abated using remedial measures, such as interconnecting a suitable bypass capacitance to the net so as to provide a path of discharge therethrough for the stray AC components during circuit operation. For acceptable discharging effect, the bypass capacitance (typically in the form of a bulk capacitor, a bypass rail formed by a bank of capacitors coupled in parallel, or the like) must be placed within a certain predetermined distance from the point of interconnection to that net. Such mutual proximity requirement, for example, then requires the bypass capacitance to be located on the circuit layout no more than the predetermined distance away from the given net's pin to which it is to be connected.

In accordance with certain aspects of the present invention, the process of selecting one or more appropriate locations at which to place a bypass capacitance or other such portion of an electronic circuit design relative to another portion of the circuit design is simply yet effectively guided by a circuit design editor equipped with the subject system and method. More specifically, the subject system and method provides a highly improved graphic interface which dynamically displays for the user visual indicia delineating the locus of permissible locations on the circuit design layout for a first circuit portion with respect to at least one second circuit portion. Preferably, the visual indicia graphically delineate a multi-dimensional zone of permissible locations about the second circuit component at which the first component may be permissibly placed. For example, a peripheral boundary graphically circumscribing this zone may be generated and visually displayed by the circuit design editor in any suitable form known in the art.

Where more than one viable second circuit portion are present in the circuit design layout for a first circuit portion to be placed, the zone for each viable second circuit portion may be generated and displayed for the user collectively or sequentially, depending on the particularly intended embodiment and application. The viable second circuit portions in that case may be ranked or otherwise sorted in suitable manner, so as to avoid excessive visual clutter in displaying their respective zones. For example, one or more of the second circuit portions may be identified as the nearest to a prospective location on the layout being considered for the first circuit portion. As the user moves a graphic pointer around to different prospective locations on the displayed layout, then, the corresponding zones of permissible locations for the nearest second circuit portions are dynamically displayed to visually alert and guide the user during the process. The user may thereby select a permissible location for the first circuit portion quite knowingly, and in highly informed manner.

Turning to the illustrated case of selectively placing a bypass capacitance for a power rail net on a circuit design layout this way, more than one pin may be available for interconnection to the power rail. The user may interactively drag a cursor (or other graphic pointer) to explore different prospective placement locations for the power rail's bypass capacitance on the displayed circuit layout. At each location thus explored, the nearest power rail pin is preferably highlighted, and a zone of permissible placements (such as a circular ring graphically superimposed about the pin) is visually presented to the user. Then, as the user moves away from that location on to another prospective location, a different pin may be highlighted as it replaces the other pin as the one nearest to the new location being explored. The zone-indicating ring is also visually presented about this different pin. The user may continue the process until a suitable location is selected for the bypass capacitance to serve the given power rail.

More generally, when a component is similarly selected for placement in the physical circuit layout, it is preferable to define a valid zone (or zones) of placement for the component and depict it in the circuit editor. When the valid zone is defined relative to a single, second component which is known to be paired to the selected component, this process is relatively uncomplicated. However, in certain circumstances (such as in the illustrative example of bypass capacitance, above), there may be a plurality of possible zones of placement, each relative to one of a plurality of second components, and any of the second components might be paired to the selected component depending on the choices of the designer. One approach in such circumstances is to depict all possible zones of placement, but the resulting depiction can become crowded to the point of uselessness. A second and preferable approach is described herein.

Briefly, a system and method realized in accordance with certain aspects of the present invention provide for adaptive pairing of a selected component (for convenience, also described as a "first" component hereinafter) with one or more of a plurality of other (for convenience, "second") components according to predetermined proximity criteria, such as which of the second components is placed closest to or farthest from a present placement of the first component. Based on the pairing, visual indicia to represent a mutual placement zone for the pairing—that is, a zone of placement defining a locus of valid placement locations for the first component—is generated and depicted in the circuit editor. (In an alternate embodiment, the generated zone of placement defines a locus of valid placement locations for the paired second component relative to the present placement of the first component.) A designer or other user can then move the first component (or paired second component) into the depicted zone, thereby guided to a more effective placement of the two components.

Because mutual placement zones are not, in most circumstances, depicted for all of the plurality of second components in this approach, but only for one or a subset thereof, the circuit editor is not unnecessarily cluttered with visual indicia for less relevant or irrelevant placement zones. Processing time for determining the placement zones and generating the visual indicia is also reduced. As an additional benefit, the visual indicia serve as a visual cue as to the most relevant of the second components, based on the proximity criteria.

An electronic circuit design is defined by a plurality of electronic components mutually placed relative to one another, and interconnected by a plurality of nets routed therebetween. The electronic components can include a wide variety of electronic elements known in the art, including but not limited to active devices such as transistors and diodes; discrete elements such as capacitors, inductors, and resistors; integrated subcircuits; pins of another component; or the like.

It is common practice in the art first to design a schematic, where the interactions of the components are represented; next, the components are placed in a physical layout which represents their spatial arrangement relative to each other; and finally, the nets are routed through the physical layout to connect the components in accordance with the schematic. Once the design is complete and suitably tested, a physical circuit is manufactured based on the layout of the design.

When components are expected to interact with each other, placement criteria are preferably predetermined for one or the other component, or for the pairing of the two, according to the interaction. Placement criteria can include but are not limited to a maximum (or minimum) allowed distance between the two components, or a side or portion of one component that the other component must face. These criteria are preferably predetermined along with their values as part of a manufacturing standard, set of design rules, or similar. These placement criteria can be used during a layout placement stage of the design process to determine a non-infinite locus of valid placement locations—that is, a mutual placement zone—of one component with respect to the other.

During the placement stage of the design process, it is desirable to determine these mutual placement zones for each pairing of a selected component with any other components relevant to its placement, and present the zones in a useful fashion to a designer, to thereby guide the placement of the selected component so as to fall within the zone or zones. However, in some cases, it is not yet certain as of the placement stage, which components will be relevant.

For example, although many interactions between specific components are decided at the schematic stage, some interactions are flexible until the layout placement is complete. As previously described, one example is a bypass capacitance portion. A bypass capacitor (also known in the art to serve as a filter capacitor) is coupled to a DC power domain in a circuit to dampen AC components of noise or other such disruptive effects, and thereby prevent undue fluctuation of the voltage provided at a given power plane or a particular extension thereof (Details of how bypass capacitance operates are well-known in the art and will not be described herein.) A bypass capacitance portion of the circuit may also take other forms, such as a bulk capacitor—that is, a parallel bank of capacitors. For brevity and convenience, a single bypass capacitor will generally be referred to hereinafter, but it is recognized that the same principles apply to any suitable bypass capacitance portions.

Typically, a suitable bypass capacitance portion interconnected with any power pin in a power domain (that is, any terminal of an extension from a given power plane) sufficiently dampens AC noise effects throughout the power domain, and a second bypass capacitance portion for the same power domain is not required. Therefore, at the schematic stage, a designer can generally associate a bypass capacitor with a particular power domain. Then, at the layout placement stage, a designer selects a specific pin within the domain to which the bypass capacitor will be connected. That is to say, the power pins of the power domain are all made eligible for pairing with the bypass capacitor at the schematic stage of design, and one is selected for this pairing at the placement stage. It is noted that a designer or manufacturing standard may have multiple bypass capacitance portions coupled to the same power domain, preferably at pins in different sections thereof; however, for brevity and convenience, it is assumed hereinafter that one bypass capacitance portion will be coupled to each power domain.

For convenience and brevity, embodiments of the invention in the specific context of bypass capacitors and power pins will be described in this description. However, it will be appreciated by those of skill in the art that the principles described herein can be extended to apply to other mutually paired components, depending on the particularly intended embodiment and application, where a placement of one component influences the valid or preferred placement of the other component according to applicable placement criteria.

FIG. 1A depicts an illustrative example of a circuit layout representing a portion of a circuit, as it would be presented in a circuit layout editor in the placement stage of design, according to an embodiment of the invention. An integrated subcircuit has seven power pins. Power pins 101, 103, 105, 107, and 109 are in a first power domain, and power pins 111 and 113 are in a second power domain.

Bypass capacitor 20 has been associated with the first power domain as part of the schematic design stage, but, in the illustrative example of FIG. 1A, has not been associated with any of the specific pins 101, 103, 105, 107, and 109 of the first power domain. A designer may therefore place the bypass capacitor 20 as convenient to connect to any of the pins 101, 103, 105, 107, and 109. (A second bypass capacitor would, in practice, be associated with the second power domain, but has been omitted for simplicity of depiction.)

Preferably, the interface of the circuit editor presents the need for a bypass capacitor in association with the first power domain, and allows a user to place bypass capacitor 20 pre-associated with the first power domain; or, in the alternative, to associate an unassociated bypass capacitor already (tentatively) placed in the layout with a power domain in need of a bypass capacitor.

In certain embodiments, when bypass capacitor 20 is selected, the applicable associations—that is, the pins 101, 103, 105, 107, and 109 of the associated power domain—are distinguished from other pins and components with visual indicia. For example, as depicted, pins 101, 103, 105, 107, and 109 are presented as solid circles, in contrast to pins 111 and 113 which are hollow circles. Other suitable visual indicia to indicate which pins are associable or pairable with the bypass capacitor 20 are well-known in the art, and include but are not limited to coloration, alteration of the outline, and alteration of brightness levels.

As previously stated, because bypass capacitor 20 may interact with any of pins 101, 103, 105, 107, and 109 in the final design, there is a mutual placement zone which may be generated for each pairing of bypass capacitor 20 and one of these pins. In the example of a bypass capacitor paired with a power pin, the predetermined placement criteria preferably includes a predefined maximum distance between the two components. This maximum distance helps to limit the length of the net which must be routed between the bypass capacitor and the power pin, so as to preserve sufficient effectiveness of the bypass capacitor in dampening AC noise.

It is noted that the degree of precision by which distance predicts effectiveness is dependent on details both of the specific application and of the actual routing between the components. That is, in practice, the effectiveness of the bypass capacitor may be subject to further variation, and the maximum distance is an approximation of this effectiveness that may or may not represent a precise limit.

Figure 1B:
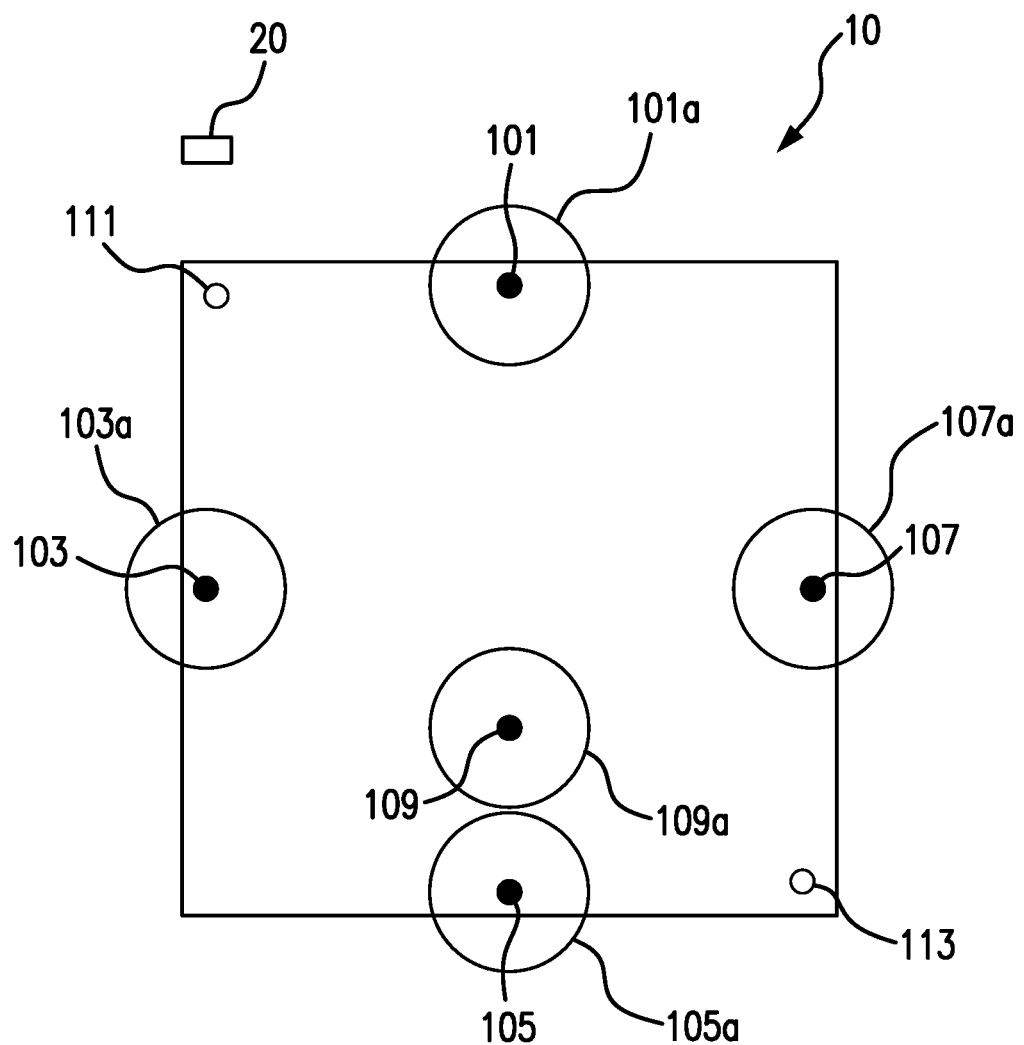

Once mutual placement zones are determined, they are preferably represented in the circuit editor for the benefit of the designer. FIG. 1B depicts the illustrative example layout of FIG. 1A with visual indicia added to represent the mutual placement zones for bypass capacitor 20. That is, visual indicia 101a, 103a, 105a, 107a, and 109a respectively represent the mutual placement zones for power pins 101, 103, 105, 107, and 109, relative to bypass capacitor 20. (Because power pins 111 and 113 are not associated with bypass capacitor 20, no visual indicia are presented for either pin.)

In the depicted embodiment, the visual indicia include an outline which indicates the border of the locus of valid placement locations for the selected component—bypass capacitor 20—relative to the paired component—one of the power pins 101, 103, 105, 107, and 109. In an alternate embodiment, the visual indicia includes an outline which indicates the border of the locus of valid placement locations for any one of the paired components relative to the selected component, producing a single outline surrounding bypass capacitor 20. Other suitable visual indicia to indicate either locus, or the mutual placement zones more generally, are well-known in the art, and include but are not limited to a shading or coloring of the entire locus, generating a straight line between the bypass capacitor and the power pin at the edge of the locus, or individually marking all valid placement locations.

In the depicted embodiment, the only predetermined placement criteria reflected by the outline indicia is a maximum distance between components, and therefore each border is a simple circle centered on the respective pin. In alternate embodiments, other or additional criteria are employed and the borders may be expected to take other forms. In one example alternate embodiment, the criteria also include a requirement that the bypass capacitor not share space with other components, such as integrated subcircuit 10, and therefore visual indicia 101a, 103a, 105a, 107a, and 109a may take the form of circle segments rather than complete circles, each chord formed from the edge of the integrated subcircuit 10. In another example alternate embodiment, the only criterion is a predefined maximum net length, which may produce an irregular shape dependent on the presence of several components and factors.

To meet the predetermined placement criteria for the pairing of bypass capacitor 20 with any one of the power pins, it must be placed at a placement location within that power pin's mutual placement zone. For example, to pair bypass capacitor 20 with power pin 101, the user moves bypass capacitor 20 within the corresponding visual indicia 101a, as depicted in FIG. 1C.

At this point, bypass capacitor 20 is placed at a valid placement location with respect to power pin 101. Additional indicia, or changes to the existing indicia, may indicate a successful placement. For example, as depicted in FIG. 1C, a straight-line placeholder 21 for the expected net between the two components (commonly called a "rat" in the art) is added to the layout. In alternate embodiments, these indicia include but are not limited to changing the color of an existing rat, changing the color of one or both of the paired components, or removing the placement zone visual indicia.

Figure 1C:
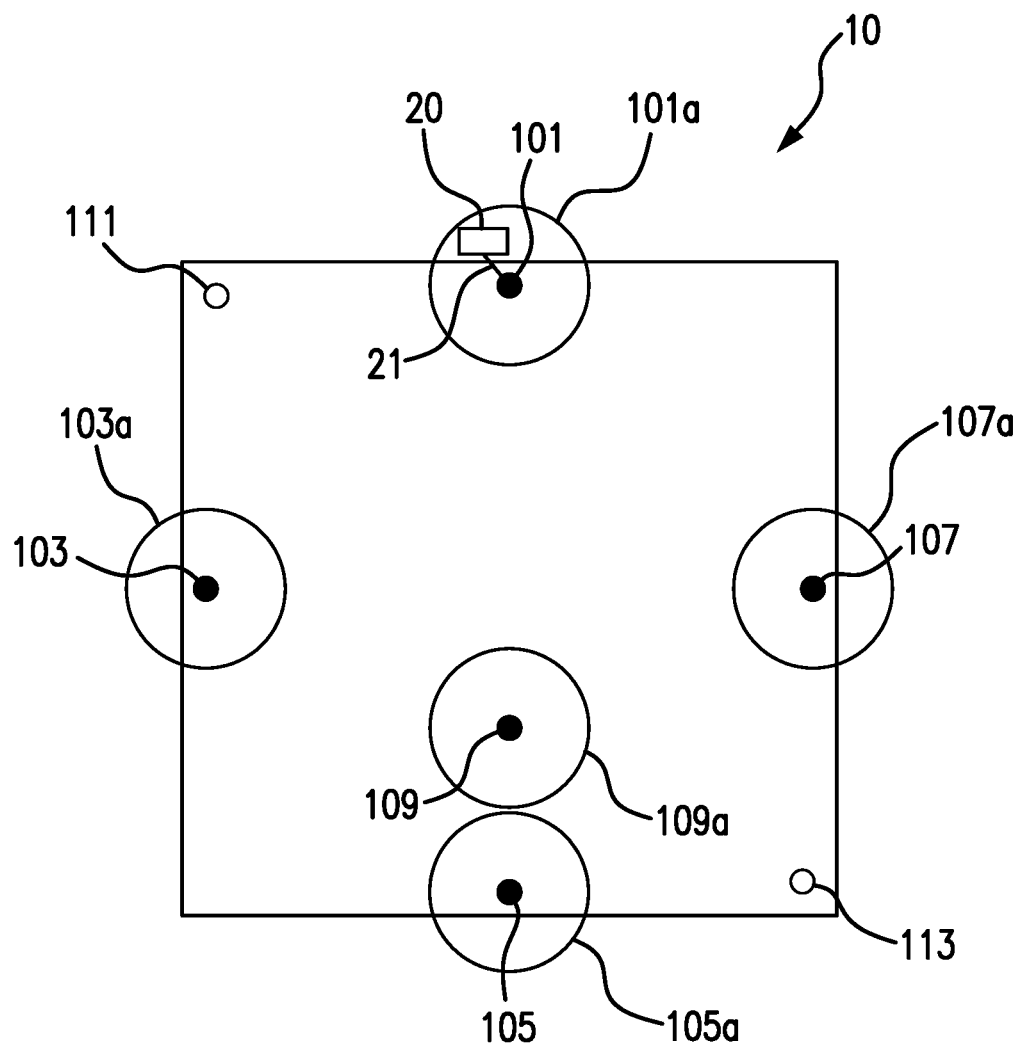
Figure 2:
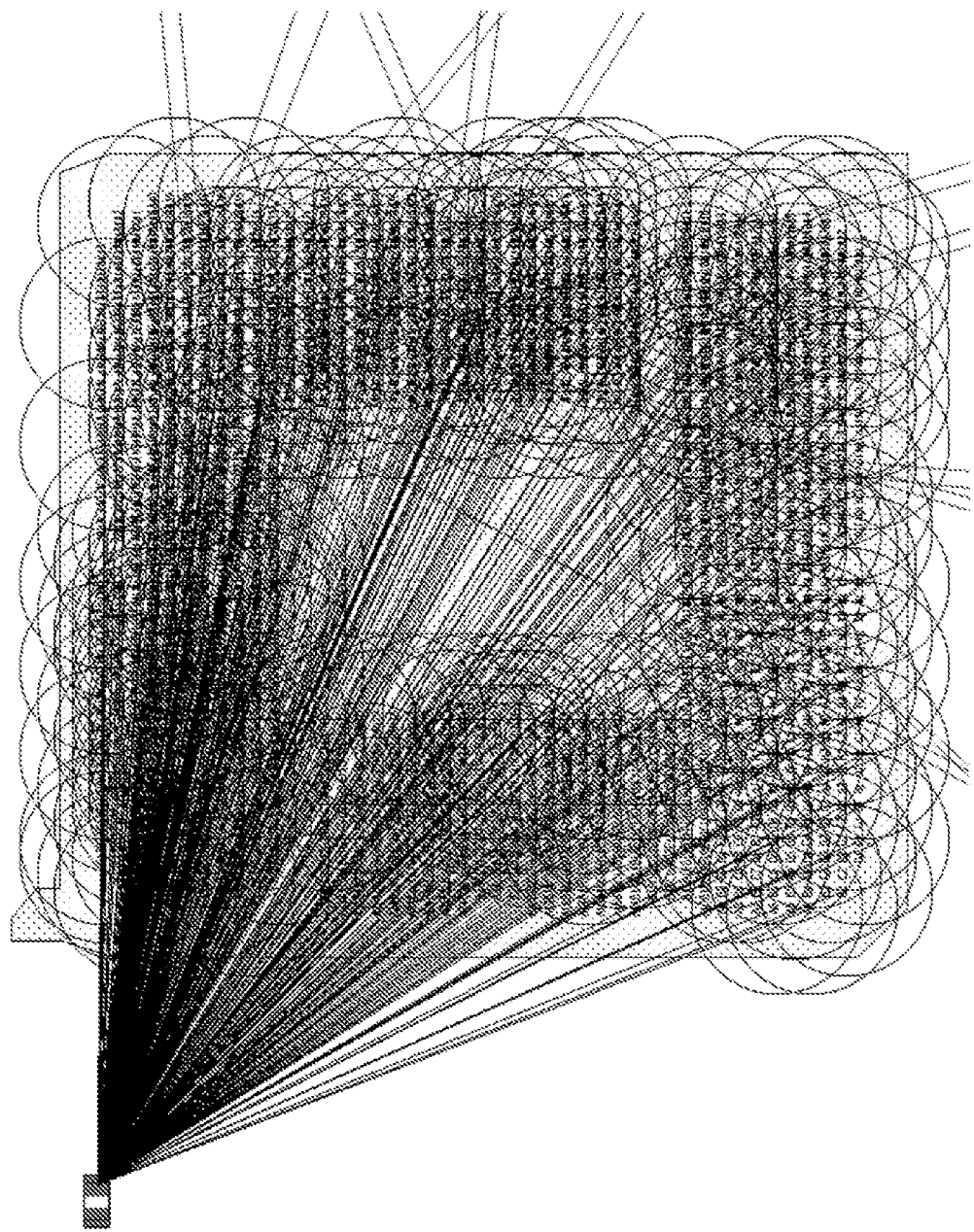
FIG. 2 is a depiction of an illustrative example of an additional circuit layout, as presented in a circuit layout editor in accordance with an exemplary embodiment of the present invention.

As depicted in FIGS. 1B and 1C, visual indicia are generated for all power pins in the associated first power domain. However, in practice the number of applicable power pins (or other components, in alternative applications) can be numerous, resulting in equally numerous visual indicia. FIG. 2 depicts a practical implementation of the embodiment depicted in FIGS. 1B and 1C, applied to a common subcircuit. As can be seen, several dozen applicable power pins have resulted in visual indicia cluttering the layout to the point of uselessness. It is therefore preferable to limit the number of visual indicia concurrently presented to the designer for reasons of practical usability.

Figure 1D:
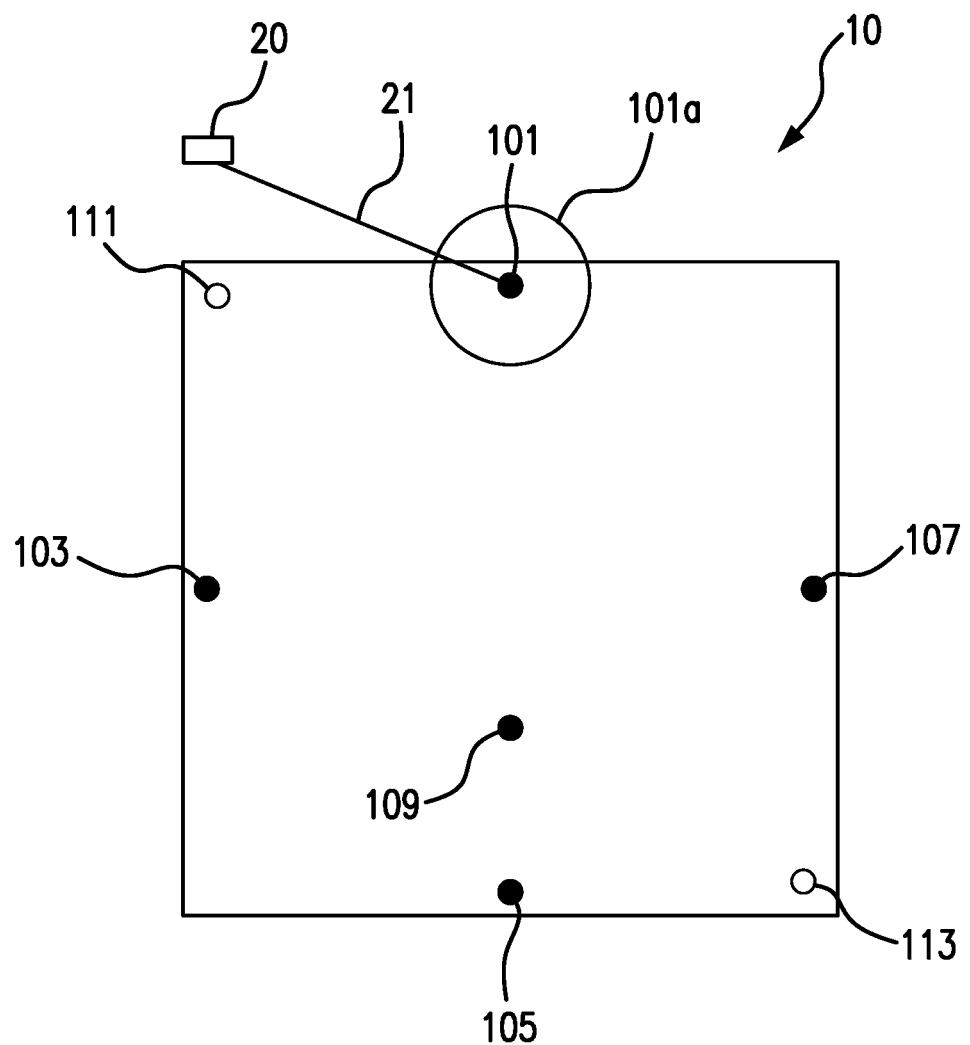
Figure 1E:
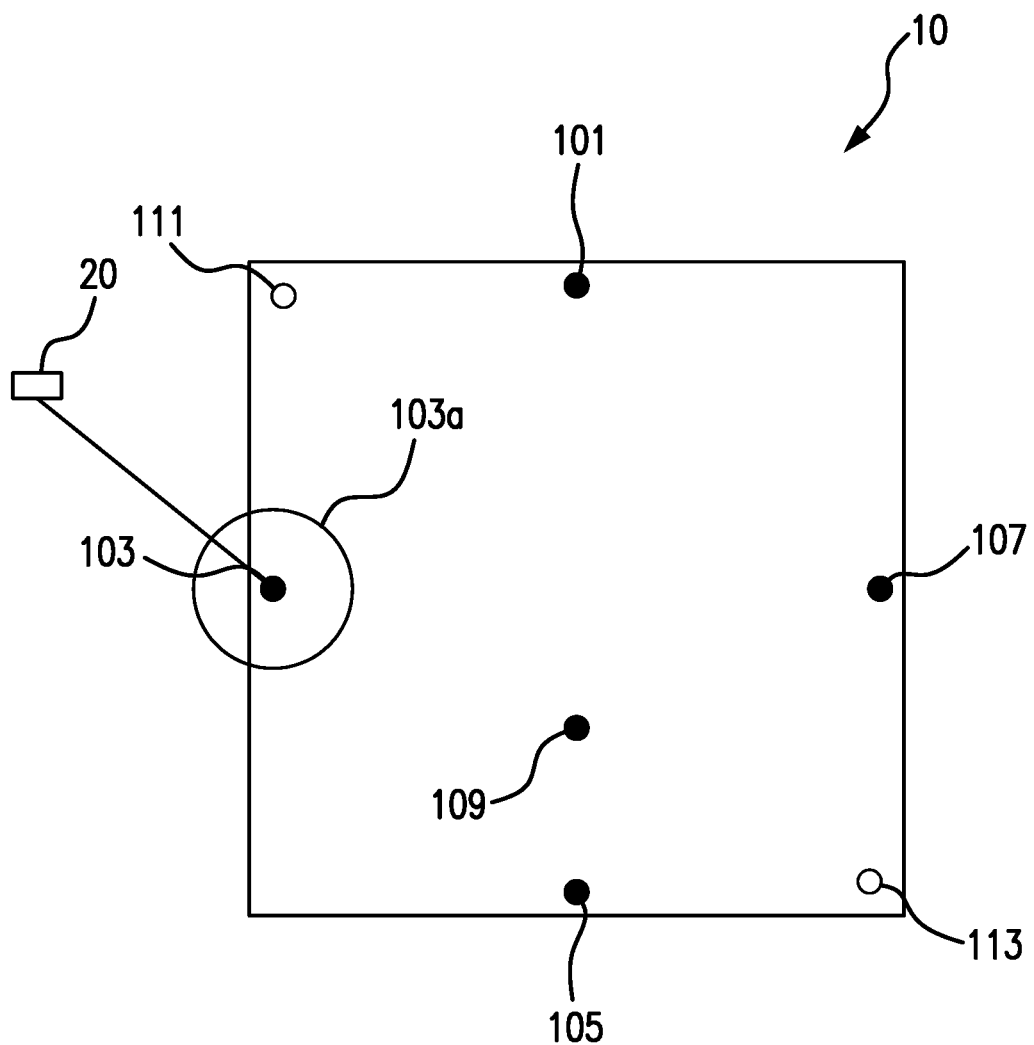

FIGS. 1D and 1E depict the illustrative example layout of FIG. 1A with visual indicia added to represent one of the mutual placement zones for bypass capacitor 20. Preferably, only one mutual placement zone for one of the power pins is indicated at any given time to reduce cluttering of the layout, though more than one zone may be concurrently presented to the extent practicable in other embodiments and applications. This power pin is selected according to predetermined proximity criteria in relation to the selected location of the bypass capacitor. In a preferred embodiment, the power pin closest to the selected location of the bypass capacitor is selected. The bypass capacitor and the power pin are then adaptively paired.

In FIG. 1D, power pin 101 is the closest of the plurality of power pins to bypass capacitor 20. Therefore, power pin 101 and bypass capacitor 20 are paired, and visual indicia 101a is generated to represent the mutual placement zone between bypass capacitor 20 and power pin 101. Visual indicia for the other mutual placement zones are not generated.

In the depicted embodiment, a rat 21 is generated between power pin 101 and bypass capacitor 20 at the time of pairing, as visual indicia of the pairing. However, in alternate embodiments, rat 21 is not generated until bypass capacitor 20 is validly placed, as in FIG. 1C. Additionally, other suitable visual indicia to indicate the pairing, with valid placement or otherwise, are well-known in the art, and include but are not limited to matching coloration, and surrounding both components with a mutual outline.

In FIG. 1E, a user has moved bypass capacitor 20. According to the same proximity criteria, the closest power pin is now power pin 103 and not power pin 101. Therefore, power pin 101 and bypass capacitor 20 are unpaired, and instead power pin 103 and bypass capacitor 20 are paired. Additionally, visual indicia 101a is removed and replaced with visual indicia 103a to represent the mutual placement zone between bypass capacitor 20 and power pin 103. Rat 21 is also regenerated to connect power pin 103 and bypass capacitor 20.

Using the approach depicted in FIGS. 1D and 1E, cluttering is reduced and the designer is presented only with the most convenient placement. Preferably, the applicable association visual indicia remain, so as to indicate alternative pairings to the designer without the crowding of placement visual indicia.

A general flow of processes for interactively editing an electronic circuit design, in accordance with an exemplary embodiment of the present invention, will now be described with reference to FIGS. 3A and 3B.

Figure 3A:
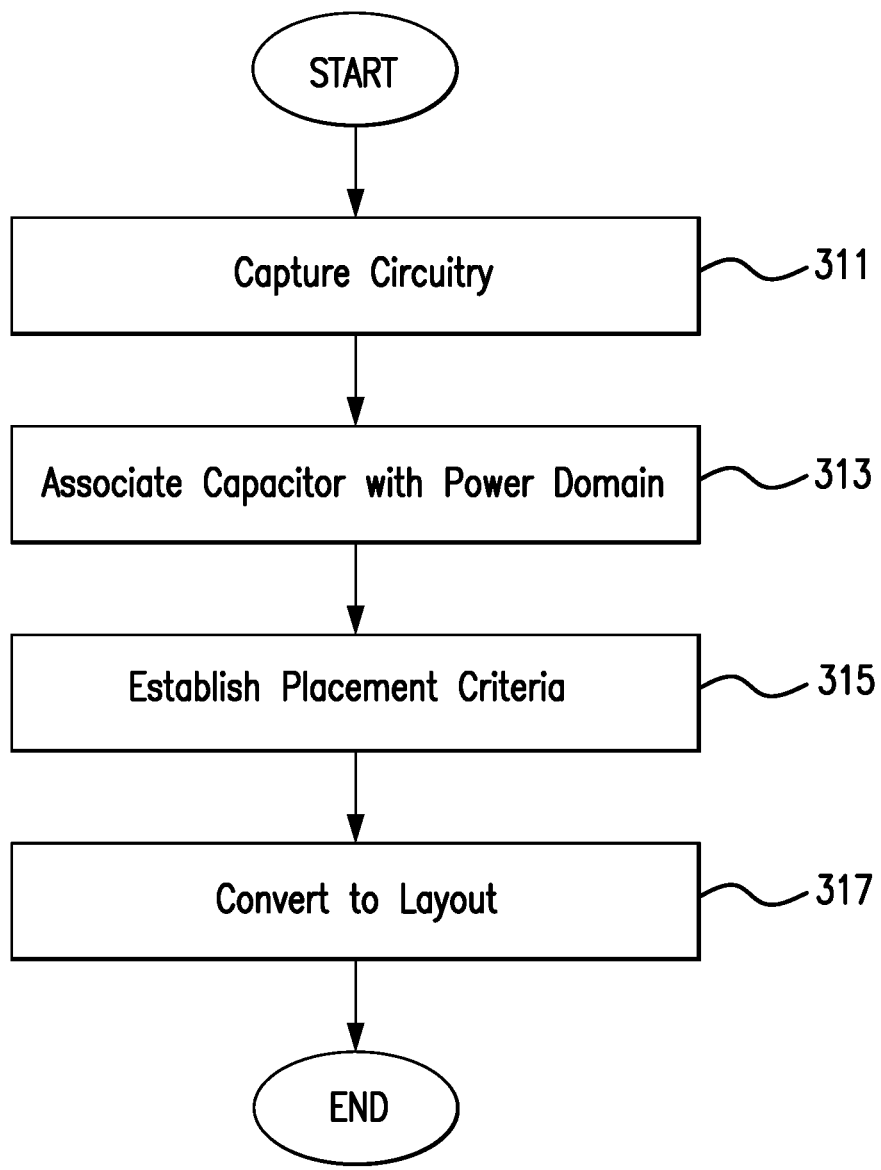
FIG. 3A is a flow diagram illustrating a flow of processes for identifying and associating a first component with a plurality of second components, in accordance with an exemplary embodiment of the present invention.
Figure 3B:
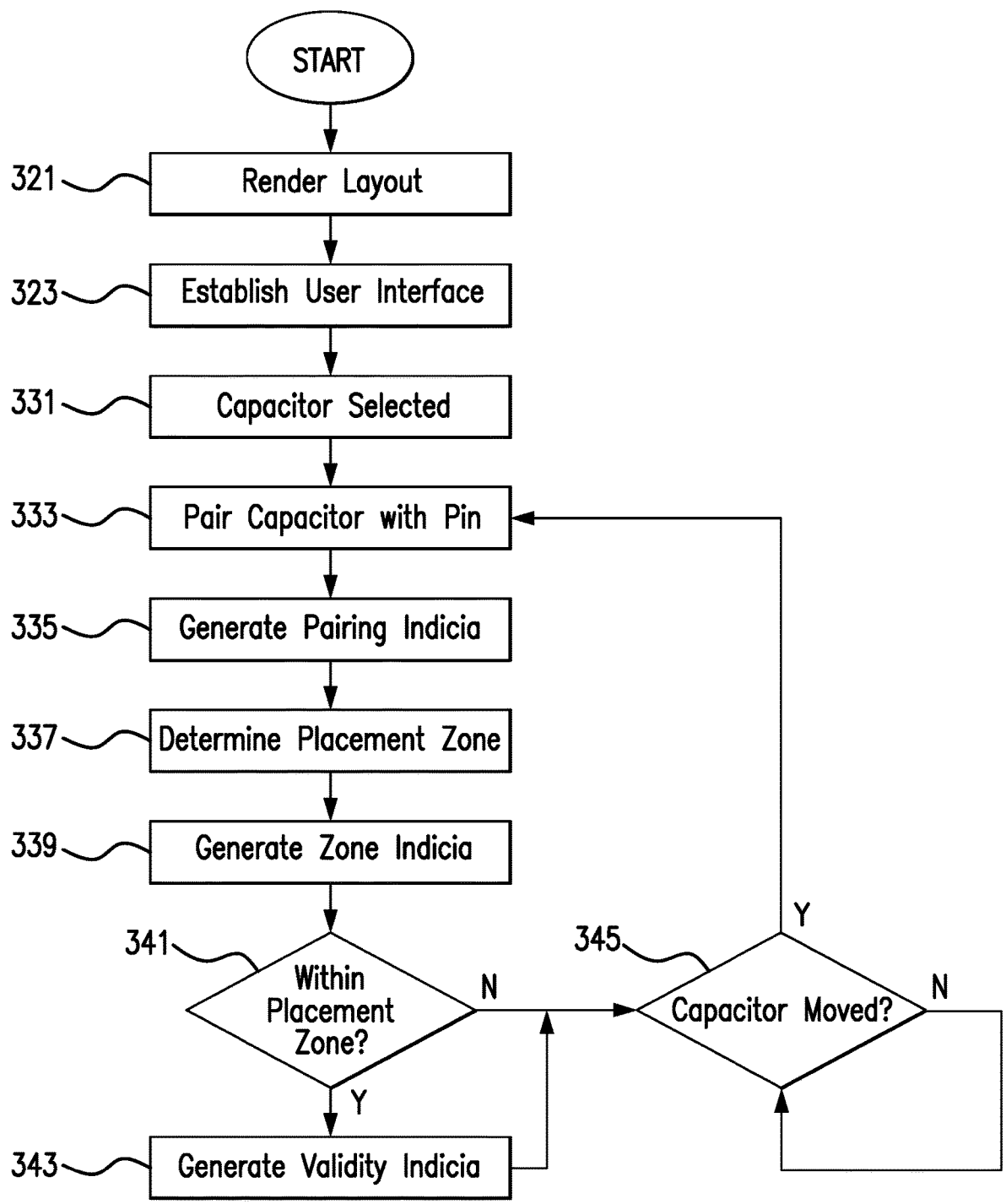
FIG. 3B is a flow diagram illustrating a flow of processes for placing a first component relative to a plurality of second components, in this example a bypass capacitor and the power pins of a power domain, with dynamic visual guidance for relative placement, in accordance with an exemplary embodiment of the present invention.

FIG. 3A more specifically depicts a method for identifying and associating a first component with a plurality of second components, in this example a bypass capacitor and the power pins of a power domain, in accordance with an exemplary embodiment of the present invention. At block 311, the circuitry of a schematic of an electronic circuit design is captured; that is, the electronic components in the schematic are identified and representative data structures therefor are generated. In some embodiments, an existing schematic is analyzed, while in other embodiments the schematic is developed in a circuit design tool and the capture process is integrated into the design process. Both measures for circuit capture are well-known in the art and will not be described further herein.

At block 313, an appropriate bypass capacitor is associated with a power domain in the schematic. If an appropriate bypass capacitor is not already in the schematic, in certain embodiments one will be added automatically. This association is preferably repeated for each identified power domain, or each portion of a power domain within an identified portion of the schematic, such as an integrated subcircuit.

At block 315, placement criteria for each association are established or otherwise provided. In certain embodiments, the placement criteria are the same for each association, and predetermined according to a manufacturing standard. In certain other embodiments, placement criteria for each association are determined and set according to a predetermined rule of a manufacturing standard or other rule set, based on factors such as voltage of the power domain or capacitance of the bypass capacitor. In a preferred embodiment, the placement criteria include a maximum allowed distance between the bypass capacitor and a power pin of the power domain.

At block 317, the captured circuitry of the schematic as a whole is converted to a suitable layout format which represents the electronic circuit design as a physical layout. Multiple such formats are known in the art, each with their own measures for conversion, and include physical netlists and logical databases. In certain embodiments, an initial placement for each component relative to the other components is also generated during the conversion; suitable automatic placement measures are also known in the art.

With the electronic circuit design represented in a suitable layout format, the components of the circuitry may be further placed relative to each other. FIG. 3B depicts a method for placing a first component relative to a plurality of second components, in this example a bypass capacitor and the power pins of a power domain, with dynamic visual guidance for relative placement, in accordance with an exemplary embodiment of the present invention.

At block 321, the electronic circuit design is visually rendered on a suitable display so as to graphically represent the physical layout. Various suitable rendering measures are known in the art, depending on the particularly intended embodiment and application. Various types of displays are also known in the art and include any device capable of visual presentation, including but not limited to a computer monitor, laptop screen, tablet screen, handheld screen, panel screen, smart phone, smart watch, television, projector, electronic paper, head-mounted display, holographic display or other three-dimensional projector, or virtual reality/augmented reality system.

The graphic representation of the physical layout preferably reflects, among other features, the placement of certain electronic components. However, certain components like bypass capacitors for power pins may remain to be placed manually.

At block 323, a suitable user interface is established or otherwise provided. The user interface enables a user to, among other actions, control the movement—that is, adjustably set the placement—of some or all of the components. If manual placement of any component is required, the user interface preferably enables this placement. Suitable user interfaces are well known in the art, and include but are not limited to keyboards, mice, trackballs, touch pads, touch screens, and voice control. Preferably, the electronic circuit design is re-rendered on the display to reflect each movement. In various embodiments, the display also renders visual indicia as appropriate to guide the user's actions; some possible indicia will be described further herein.

As previously described, in those cases where certain components must preserve/comply with certain mutual placement criteria therebetween, one of such "paired" components must be placed within a valid zone of placement defined relative to one or more of the other components. However, as previously described, certain components, such as in the illustrative example of bypass capacitance, have a plurality of second components with which it may be paired. Thus, each component may be selectively placed within a zone of placement for any of those second components. In a typical embodiment, this complication makes accurate placement of the component by automatic measures impractical, in turn making it preferable for a designer to manually place the component, or at least to manually adjust an automatic placement thereof.

Referring again to FIG. 3B, at block 331, a first component—again, a bypass capacitor or bypass capacitance portion in the described example—is selected by a user through the user interface, in preparation to place or move the component.

The selected component may have been previously made eligible for pairing with a plurality of second components—again, some or all of the power pins of a power domain in the described example—as described for example with regard to block 313. If so, at block 333, the capacitor is paired with one of these power pins, according to predetermined pairing criteria, the capacitor and the power pin thereby forming a paired set. Preferably, the predetermined pairing criteria include proximity criteria; more specifically, the capacitor is preferably paired with the power pin closest thereto.

It is noted that at least some sets of predetermined pairing criteria allow for the possibility that more than one power pin be paired at the same time; for example, if the capacitor is always paired with the power pin closest thereto, and two power pins are equally close to the capacitor, then both pins may in certain embodiments be paired with the capacitor. In alternate embodiments, the predetermined pairing criteria may also include a randomized selection of one of the two in the event of a "tie."

In certain embodiments, at block 335, this pairing is indicated by generating suitable visual indicia. In certain embodiments, also at block 335, suitable visual indicia are also generated to indicate all power pins in the associated power domain (that is, all power pins eligible for selective pairing with the given component), preferably in a fashion visually distinct from the visual indicia for the paired power pin. In both cases, the visual indicia may include but are not limited to a color, shading, shape, or texture overlaying or surrounding the paired/associated power pin, a line (such as a rat) between the capacitor and the paired/associated power pin, or an outline surrounding both the capacitor and the paired/associated power pin. In the example embodiment previously depicted in FIG. 1D, for example, associated power pins 101, 103, 105, 107, 109 are overlaid with a dark color, in contrast to the light color of the unassociated power pins 111 and 113, and the paired power pin 101 is additionally indicated with a line (a rat) connecting the selected capacitor 20 with the paired power pin.

At block 337, a mutual placement zone for the paired set of capacitor and power pin is determined. The mutual placement zone defines a locus of valid placement locations of the paired components. Preferably, these are more specifically valid placement locations of the capacitor with respect to the power pin, as it is more convenient to move a capacitor than a power pin. However, in certain embodiments, valid placement locations of the power pin (or other second component) could be defined with respect to the capacitor (or other first, selected component).

The valid placement locations, and therefore the mutual placement zone, are determined according to predetermined placement criteria. In certain embodiments, these placement criteria are explicitly predetermined for each possible pairing, or for each association, but preferably, the criteria are applied universally for each type of pairing set (e.g. for all pairings of bypass capacitance portions with power pins). Preferably for the example of pairings of bypass capacitance portions with power pins, the placement criteria include a predefined maximum distance between the bypass capacitor and the paired power pin (as in the example embodiment previously depicted in FIG. 1D). In certain embodiments, this distance may be itself determined based on factors including but not limited to the voltage of the power domain or the capacitance of the bypass capacitor.

At block 339, the placement zone is indicated by generating suitable visual indicia. The placement zone visual indicia may include but are not limited to an outline indicating a border of the locus (as in the example embodiment previously depicted in FIG. 1D), or a color, shading, shape, or texture overlaying the locus.

If, due to the placement criteria, the placement zone intuitively indicates the paired power pin, in certain embodiments the placement zone visual indicia act in place of the pairing visual indicia that would in other embodiments be generated at block 335. For example, if the placement criteria include only a predefined maximum (or minimum) distance from the paired power pin, then the locus will be visually centered on the paired power pin, which will suffice to indicate the pairing.

In certain embodiments, at block 341, it is additionally determined whether the capacitor is within the mutual placement zone; that is, if its location is a valid placement location. If so, in certain embodiments, at block 343, this valid placement is indicated by generating suitable visual indicia, which is preferably visually distinct from other visual indicia generated in previous operations. The validity visual indicia may include but are not limited to a color, shading, shape, or texture overlaying or surrounding the capacitor and/or the power pin, a line (such as a rat) between the capacitor and the power pin, or an outline surrounding both the capacitor and the power pin. In certain embodiments, the validity visual indicia include removal of other visual indicia, such as the placement zone visual indicia.

If the predetermined pairing criteria include proximity criteria, then the pairing is dependent on the current location of the selected capacitor. Therefore, at block 345, it is determined whether the selected capacitor has been moved by the user to a new location within the visually rendered physical layout. If not, the process continues to wait at block 345 until the capacitor is moved (or another component is selected). If the selected capacitor is moved, however, the process returns to the pairing operation at block 333 and repeats from there. It is noted that the pairing operation at block 333 may determine that the same power pin is still the paired pin, in which case the operations in the next iteration of blocks 335-339 may be suitably abbreviated.

Figure 4:
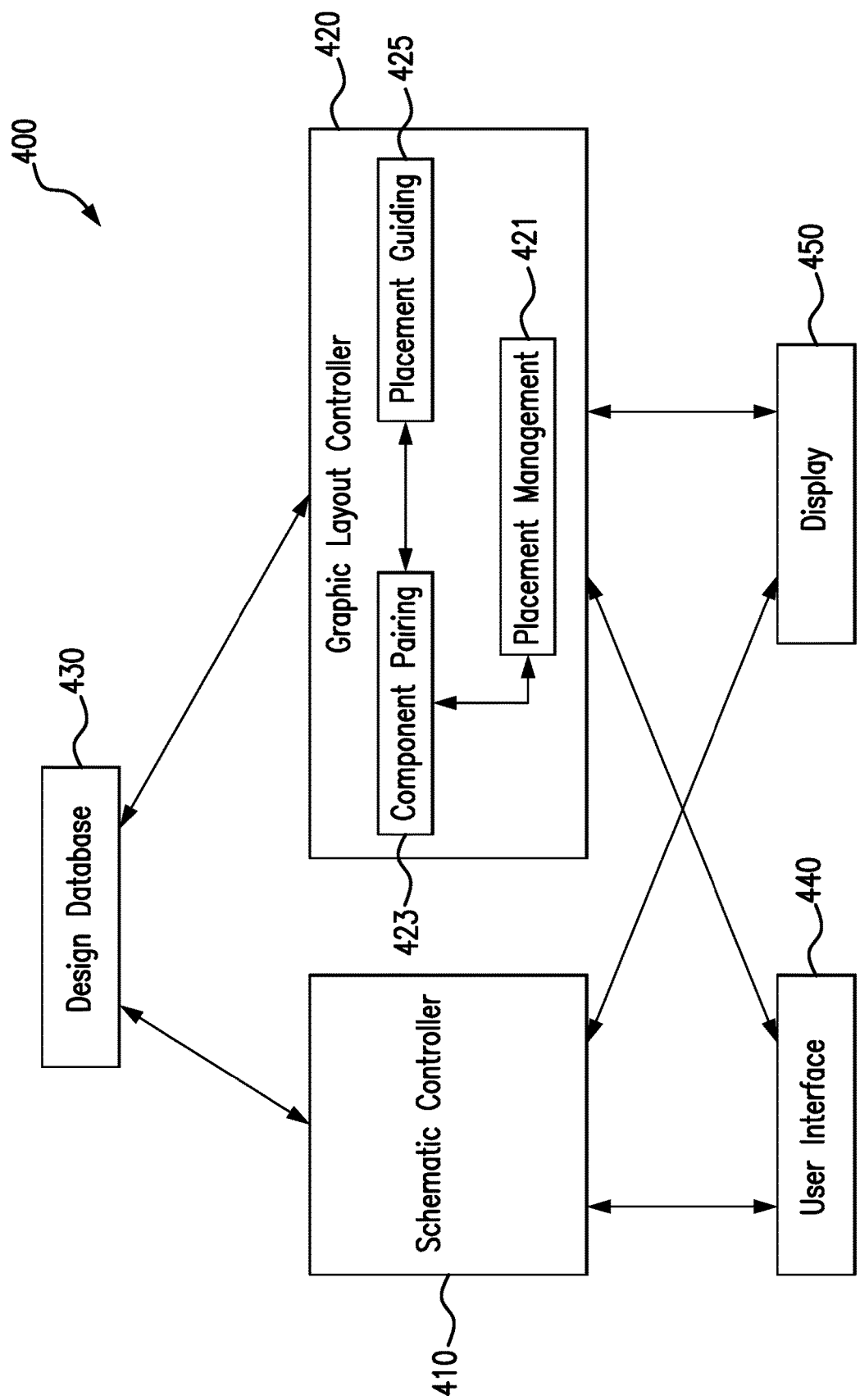
FIG. 4 is a block diagram illustrating a system for interactively editing an electronic circuit design, with dynamic visual guidance for relative placement, in accordance with an exemplary embodiment of the present invention.

FIG. 4 depicts a system 400 for interactively editing an electronic circuit design, with dynamic visual guidance for relative placement, in accordance with an exemplary embodiment of the present invention.

A system 400 includes a schematic controller 410 and a graphic layout controller 420. Both controllers are coupled to a design database 430, a user interface 440, and a display 450.

The schematic controller 410 is executed on a processor to generate and edit a schematic of an electronic circuit design. This generation and editing preferably includes capture of the circuitry of the schematic, association of appropriate bypass capacitors with power domains (or, in other exemplary embodiments, other first components with pluralities of second components), and provision of placement criteria. Preferably, this generation and editing is performed in accordance with operations 311, 313, and 315 of FIG. 3A. In various embodiments depending on the particularly intended embodiment and application, the generation and editing employs user input which is provided through the user interface 440, and provides user feedback via the display 450 or other suitable means known in the art.

In certain embodiments, the schematic controller 410 also converts the captured circuitry to a suitable layout format, for example in accordance with operation 317 of FIG. 3A, and then stores the converted design to the design database 430; the graphic layout controller 420 then retrieves the converted design. In alternate embodiments, the schematic controller 410 stores the unconverted schematic to the design database 430; the graphic layout controller 420 retrieves the unconverted schematic and executes to convert it to a suitable layout format.

It is noted that, in alternate embodiments, the schematic controller 410 and the graphic layout controller 420 are coupled to separate databases, user interfaces, and/or displays, or the schematic controller 410 is effectively omitted, and the electronic circuit design is stored to the database 430 from an outside source, either in unconverted schematic or converted layout format.

The graphic layout controller 420 executes to direct the display 450 to visually render at least a part of an electronic circuit design to graphically represent a physical layout thereof. The graphic layout controller 420 also receives user input from the user interface 440, this input including entry of user-controlled movement of components of the electronic circuit design within the visually rendered physical layout.

The graphic layout controller 420 preferably includes a placement management portion 421. The placement management portion 421 receives entries of user-controlled movement of components of the electronic circuit design from the user interface 440, and places or moves the components within the visually rendered physical layout responsive to the entries.

The graphic layout controller 420 preferably includes a component pairing portion 423. In response to the movement of a selected first component (e.g. a bypass capacitance portion of the circuit design) to a selected location by the placement management portion 421, the component pairing portion 423 adaptively pairs the first component with at least a closest one of a plurality of second components of the electronic circuit design eligible for pairing (e.g. power pins in an associated power domain). Preferably, this pairing is carried out in accordance with at least operations 333 and 345 of FIG. 3B. In certain embodiments, the component pairing portion 423 also generates suitable pairing visual indicia, preferably in accordance with operations 337 of FIG. 3B.

The graphic layout controller 420 preferably also includes a placement guiding portion 425. In response to the pairing by the component pairing portion 423, the placement guiding portion 425 determines a mutual placement zone defining a locus of valid placement locations of the paired components, and generates visual indicia representing the mutual placement zone, preferably in accordance with operations 337 and 339 of FIG. 3B. In certain embodiments, the placement guiding portion 425 also determines whether the selected first component is within the placement zone, and generates suitable validity visual indicia, preferably in accordance with operations 341 and 343 of FIG. 3B. In certain embodiments, the placement guiding portion 425 also generates suitable pairing visual indicia in response to the pairing by the component pairing portion 423, preferably in accordance with operations 337 of FIG. 3B.

These and related processes, and other necessary instructions, are preferably encoded as executable instructions on one or more non-transitory computer readable media, such as hard disc drives or optical discs, and executed using one or more computer processors, in concert with an operating system or other suitable measures.

In a software implementation, the software includes a plurality of computer executable instructions, to be implemented on a computer system. Prior to loading in a computer system, the software preferably resides as encoded information on a suitable non-transitory computer-readable tangible medium, such as a magnetic floppy disk, a magnetic tape, CD-ROM, or DVD-ROM.

In certain implementations, the invention includes a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) are in certain embodiments also developed to perform these functions.

Figure 5:
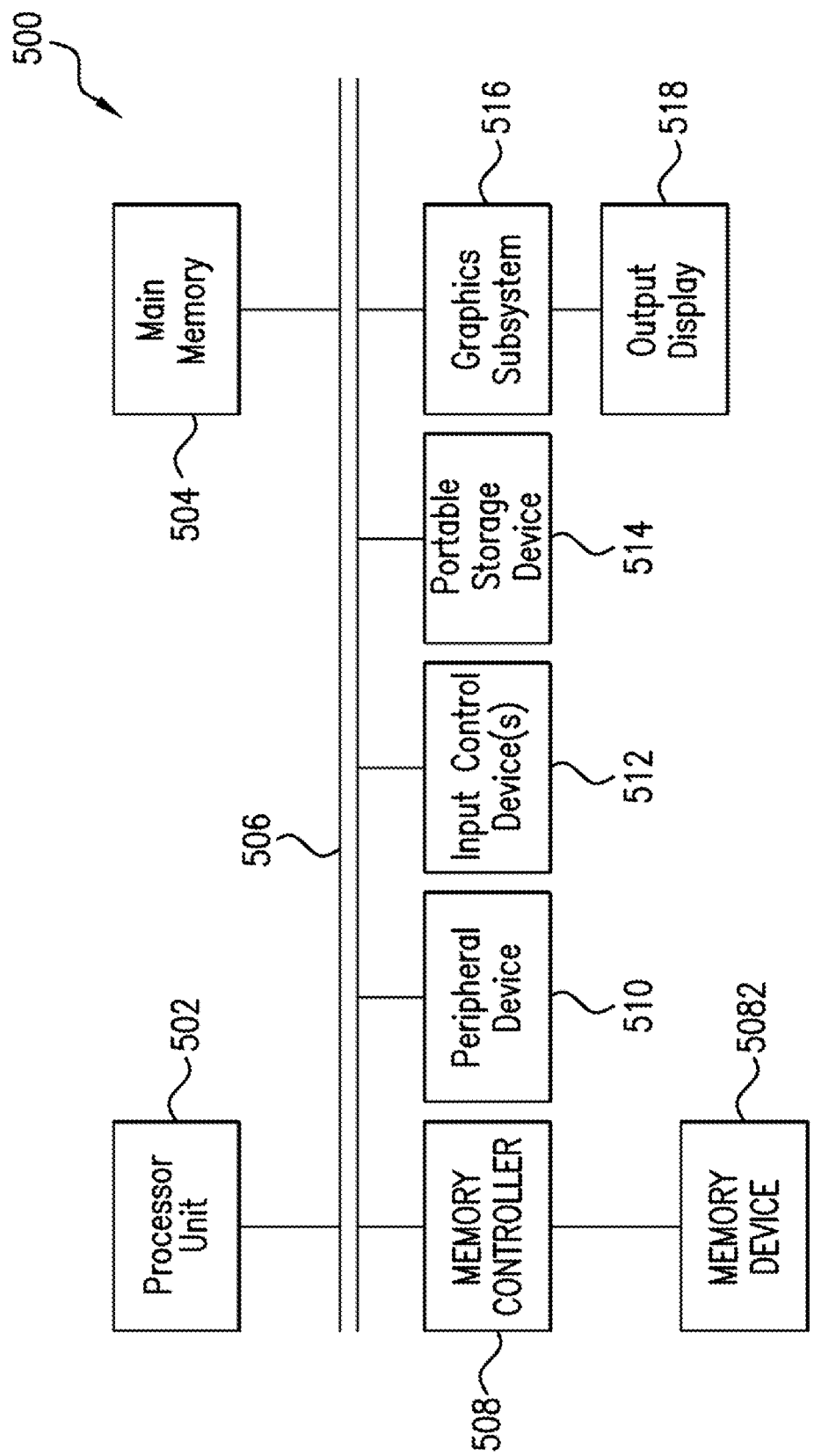
FIG. 5 is a block diagram illustrating an exemplary computer system for programmatic and/or hardware implementation of various embodiments and aspects of the present invention.

As an example, FIG. 5 is a block diagram illustrating an exemplary computer system for programmatic and/or hardware implementation of various aspects of the disclosed system and method. For instance, in various embodiments it serves as a host for such hardware modules, and/or as a host for executing software modules such as electronic design automation (EDA) tools/simulations/emulation/firmware, in accordance with various configurations of the disclosed system and method.

According to certain embodiments, computer system 500 includes a processor unit 502, a main memory 504, an interconnect bus 506, a memory controller 508 that is coupled to a memory device 5082, peripheral device(s) 510, input control device(s) 512, portable storage medium drive (s) 514, a graphics subsystem 516, and an output display 518. In various embodiments, processor unit 502 includes a single microprocessor or a plurality of microprocessors for configuring computer system 500 as a multi-processor system. Main memory 504 stores, in part, instructions and data to be executed by processor unit 502. Main memory 504 preferably includes banks of dynamic random access memory (DRAM) as well as high-speed cache memory.

For the purpose of simplicity, the components of computer system 500 are depicted to be interconnected via interconnect bus 506. However, in alternate embodiments, computer system 500 is interconnected through one or more data transport means. For example, in certain embodiments, processor unit 502 and main memory 504 are interconnected via a local microprocessor bus; and memory controller 508, peripheral device(s) 510, portable storage medium drive(s) 514, and graphics subsystem 516 are interconnected via one or more input/output (I/O) buses. Memory device 5082 is preferably implemented as a nonvolatile semiconductor memory for storing data and instructions to be used by processor unit 502. Memory device 5082 preferably stores the software to load it to the main memory 504, but in alternate embodiments is represented in an EDA tool simulation by suitable classes (incorporating data structures and functions operable upon the data structures) or the like as would be known to one of skill in the art.

Portable storage medium drive 514 operates to input and output data and code to and from the computer system 500. In one configuration, the software is stored on such a portable medium, and is input to computer system 500 via portable storage medium drive 514. In various embodiments, peripheral device(s) 510 includes any type of computer support device such as an input/output (I/O) interface, to add additional functionality to computer system 500. For example, in certain embodiments, peripheral device(s) 510 includes a network interface card, to interface computer system 500 to a network. In certain embodiments, peripheral device(s) also includes a memory controller and nonvolatile memory.

Input control device(s) 512 provide a portion of the user interface for a computer system 500 user. In various embodiments, input control device(s) 512 includes an alphanumeric keypad for inputting alphanumeric and other key information; and a cursor control device such as a mouse, a trackpad or stylus; or cursor direction keys.

In order to display textual and graphical information, computer system 500 includes graphics subsystem 514 and output display(s) 518. In various embodiments, output display 518 includes a cathode ray tube (CRT) display, liquid crystal display (LCD), plasma, or active matrix organic light emitting diode (AMOLED) display. Graphics subsystem 516 receives textual and graphical information, and processes the information for output to display 518.

The descriptions above are intended to illustrate possible implementations of the disclosed system and method, and are not restrictive. While this disclosure has been made in connection with specific forms and embodiments thereof, it will be appreciated that various modifications other than those discussed above may be resorted to without departing from the spirit or scope of the disclosed system and method. Such variations, modifications, and alternatives will become apparent to the skilled artisan upon a review of the disclosure. For example, functionally equivalent elements or method steps are substitutable for those specifically shown and described, and certain features are usable independently of other features. Additionally, in various embodiments, all or some of the above embodiments are selectively combined with each other, and particular locations of elements or sequence of method steps are reversed or interposed, all without departing from the spirit or scope of the disclosed system and method as defined in the appended claims. The scope should therefore be determined with reference to the description above and the appended claims, along with their full range of equivalents.

What is claimed is:

1. A system for interactively editing an electronic circuit design defined by a plurality of electronic components mutually placed relative to one another and interconnected by a plurality of nets routed therebetween, having dynamic visual guidance for relative placement of mutually paired electronic components, the system comprising:
    a display visually rendering at least a part of an electronic circuit design to graphically represent a physical layout thereof;
    a user interface for entry of user-controlled movement of a first component of the electronic circuit design within the visually rendered physical layout; and,
    a graphic layout controller executed on a processor coupled to said display, said graphic layout controller including:
        a component pairing portion adaptively pairing with the first component at each selected location thereof within the visually rendered physical layout at least two of a plurality of second components of the electronic circuit design eligible for pairing with the first component, the first and second components being paired according to predetermined proximity criteria, and
        a placement guiding portion actuated responsive to said component pairing portion to generate for each paired set of first and second components visual indicia output on the display, the visual indicia representing a mutual placement zone between the first component and each second component paired therewith, the mutual placement zone defining a locus of valid placement locations of the paired first and second components one with respect to the other according to predetermined placement criteria therefor, wherein the visual indicia include an outline indicating a border of a locus of valid first component placement locations with respect to each second component of the at least two second components and the placement guiding portion generates a straight line placeholder that is output on the display, the straight line placeholder connecting the first component with a given second component of the at least two second components in response to moving the first component within the locus of valid first component placement associated with the given second component.

2. The system of claim 1, wherein the component pairing portion pairs the first component with the second component closest to the selected location of the first component.

3. The system of claim 1, wherein the predetermined placement criteria include a predefined maximum distance between the first component and the second component.

4. The system of claim 1, wherein the component pairing portion generates visual indicia indicating each second component of the electronic circuit design eligible for pairing with the first component.

5. The system of claim 1, wherein the first component is a bypass capacitance portion and the plurality of second components is a plurality of power pins in a power domain.

6. A system for interactively editing an electronic circuit design defined by a plurality of electronic components mutually placed relative to one another and interconnected by a plurality of nets routed therebetween, having dynamic visual guidance for relative placement of mutually paired electronic components, the system comprising:
    a display visually rendering at least a part of an electronic circuit design to graphically represent a physical layout thereof;
    a user interface for entry of user-controlled movement of a bypass capacitance portion of the electronic circuit design within the visually rendered physical layout; and,
    a graphic layout controller executed on a processor coupled to said display, said graphic layout controller including:
    a component pairing portion adaptively pairing with the bypass capacitance portion at each selected location thereof within the visually rendered physical layout at least two of a plurality of power pins in a power domain associated with the bypass capacitance portion, the bypass capacitance portion and power pin being paired according to predetermined proximity criteria, and
    a placement guiding portion actuated responsive to said component pairing portion to generate for each paired set of bypass capacitance portion and power pin visual indicia output on the display, the power pin visual indicia representing a mutual placement zone between the bypass capacitance portion and each power pin paired therewith, the mutual placement zone defining a locus of valid placement locations of the paired bypass capacitance portion and power pin one with respect to the other according to predetermined placement criteria therefor, wherein the visual indicia include an outline indicating a border of a locus of valid placement locations for the bypass capacitor portion with respect to each power pin of the at least two power pins and the placement guiding portion generates a straight line placeholder that is output on the display, the straight line placeholder connecting the bypass capacitor portion with a given power pin of the at least two power pin in response to moving the bypass capacitor portion within the locus of valid locations for the bypass capacitor portion associated with the given power pin.

7. The system of claim 6, wherein the predetermined placement criteria include a predefined maximum distance between the bypass capacitance portion and the power pin.

8. The system of claim 6, wherein the component pairing portion generates visual indicia indicating each power pin of the electronic circuit design eligible for pairing with the bypass capacitance portion.

9. A method for interactively editing an electronic circuit design defined by a plurality of electronic components mutually placed relative to one another and interconnected by a plurality of nets routed therebetween, having dynamic visual guidance for relative placement of mutually paired electronic components, the method comprising:

visually rendering on a display at least a part of an electronic circuit design to graphically represent a physical layout thereof;

providing a user interface for entry of user-controlled movement of a first component of the electronic circuit design within the visually rendered physical layout;

adaptively pairing with the first component at each selected location thereof within the visually rendered physical layout at least two of a plurality of second components of the electronic circuit design eligible for pairing with the first component, the first and second components being paired according to predetermined proximity criteria;

generating for each paired set of first and second components visual indicia output on the display, the visual indicia representing a mutual placement zone between the first component and each second component paired therewith, the mutual placement zone defining a locus of valid placement locations of the paired first and second components one with respect to the other according to predetermined placement criteria therefor, wherein the visual indicia include an outline indicating a border of a locus of valid first component placement locations with respect to each second component of the at least two second components; and generating, in response to moving the first component within the locus of valid first component placement associated with a given second component of the at least two second components, a straight line placeholder that is output on the display, the straight line placeholder connecting the first component with the given second component.

10. The method of claim 9, wherein the predetermined placement criteria include a predefined maximum distance between the first component and the second component.

11. The method of claim 9, further comprising generating visual indicia indicating each second component of the electronic circuit design eligible for pairing with the first component.

12. The method of claim 9, wherein the first component is a bypass capacitance portion and the plurality of second components is a plurality of power pins in a power domain.

* * * * *